US009455601B2

(12) United States Patent
Kramer

(10) Patent No.: US 9,455,601 B2
(45) Date of Patent: *Sep. 27, 2016

(54) VARIABLE ATTRACTIVE FORCE MOTOR AND GENERATOR

(71) Applicant: Michael Kramer, Santa Monica, CA (US)

(72) Inventor: Michael Kramer, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,547

(22) Filed: Sep. 1, 2015

(65) Prior Publication Data

US 2015/0372542 A1  Dec. 24, 2015

Related U.S. Application Data

(63) Continuation of application No. 14/630,409, filed on Feb. 24, 2015, now Pat. No. 9,124,147, which is a continuation of application No. 13/539,487, filed on Jul. 1, 2012, now Pat. No. 8,963,026.

(51) Int. Cl.
| | |
|---|---|
| *H02K 21/00* | (2006.01) |
| *H02K 1/06* | (2006.01) |
| *H02K 53/00* | (2006.01) |
| *H02K 1/08* | (2006.01) |
| *H02K 7/18* | (2006.01) |

(52) U.S. Cl.
CPC ............ *H02K 1/06* (2013.01); *H02K 1/08* (2013.01); *H02K 7/1823* (2013.01); *H02K 53/00* (2013.01); *Y10S 74/09* (2013.01)

(58) Field of Classification Search
CPC .................. H01K 21/025; H01K 2201/03

USPC ............. 290/1 R; 310/12.01, 12.25, 156.01, 310/156.38, 156.45, 216.001, 216.111
See application file for complete search history.

(56) References Cited

U.S. PATENT DOCUMENTS

| | | |
|---|---|---|
| 1,361,136 A | 12/1920 | Burke |
| 2,439,193 A | 4/1948 | Weber et al. |
| 2,578,419 A | 12/1951 | Gittings |
| 2,650,581 A | 9/1953 | Short et al. |
| 3,558,941 A | 1/1971 | Visconti Brebbia |
| 3,845,997 A | 11/1974 | Boden et al. |
| 4,114,057 A | 9/1978 | Esters |
| 4,206,374 A | 6/1980 | Goddijn |
| 4,327,299 A | 4/1982 | Goddijn |

(Continued)

FOREIGN PATENT DOCUMENTS

GB    2282708    4/1995

OTHER PUBLICATIONS

Robert Adams, The Adams Pulsed Electric Motor Generator Manual, 1993.

(Continued)

*Primary Examiner* — Tho D Ta
(74) *Attorney, Agent, or Firm* — Cislo & Thomas, LLP

(57) ABSTRACT

An apparatus is disclosed for extracting electrical and mechanical energy from stored magnetic energy. The apparatus includes an axial flow turbine defined by a body having an increased magnetic density from a first exterior edge along a surface of the body to a second exterior edge. Also included is a magnetic element rotatably operable about the body of the axial flow turbine. The magnetic element is configured to cause increasingly level of the magnetic attraction from the first exterior edge to that of the second exterior edge.

17 Claims, 4 Drawing Sheets

(56) References Cited

U.S. PATENT DOCUMENTS

| | | |
|---|---|---|
| 4,686,398 A | 8/1987 | Lechner |
| 5,051,641 A | 9/1991 | Weh |
| 5,117,142 A | 5/1992 | Von Zweygbergk |
| 5,237,229 A | 8/1993 | Ohishi |
| 5,633,551 A | 5/1997 | Weh |
| 5,712,521 A | 1/1998 | Detela |
| 5,773,910 A | 6/1998 | Lange |
| 5,834,865 A | 11/1998 | Sugiura |
| 5,854,521 A | 12/1998 | Nolle |
| 5,942,828 A | 8/1999 | Hill |
| 6,043,579 A | 3/2000 | Hill |
| 6,817,507 B2 | 11/2004 | Yeon |
| 6,903,485 B2 | 6/2005 | Chen et al. |
| 7,078,838 B2 | 7/2006 | Post |
| 7,164,216 B2 | 1/2007 | Shimoyama |
| 7,385,330 B2 | 6/2008 | Trzynadlowski et al. |
| 8,215,437 B2 | 7/2012 | Watson et al. |
| 8,558,426 B2 | 10/2013 | Stiesdal |
| 9,124,147 B2 * | 9/2015 | Kramer ............ H02K 53/00 |
| 2002/0135242 A1 | 9/2002 | Kawai |
| 2005/0062348 A1 | 3/2005 | Ohnishi et al. |
| 2007/0052312 A1 | 3/2007 | Stanetskiy et al. |
| 2011/0133586 A1 | 6/2011 | Stiesdal |
| 2011/0309619 A1 | 12/2011 | Thackston |
| 2013/0270952 A1 | 10/2013 | Jurkovic et al. |

OTHER PUBLICATIONS

Robert Adams, The Revelation of the Century, An Addendum to the Adams Motor Manual, by Robert Adams, 1996.

* cited by examiner

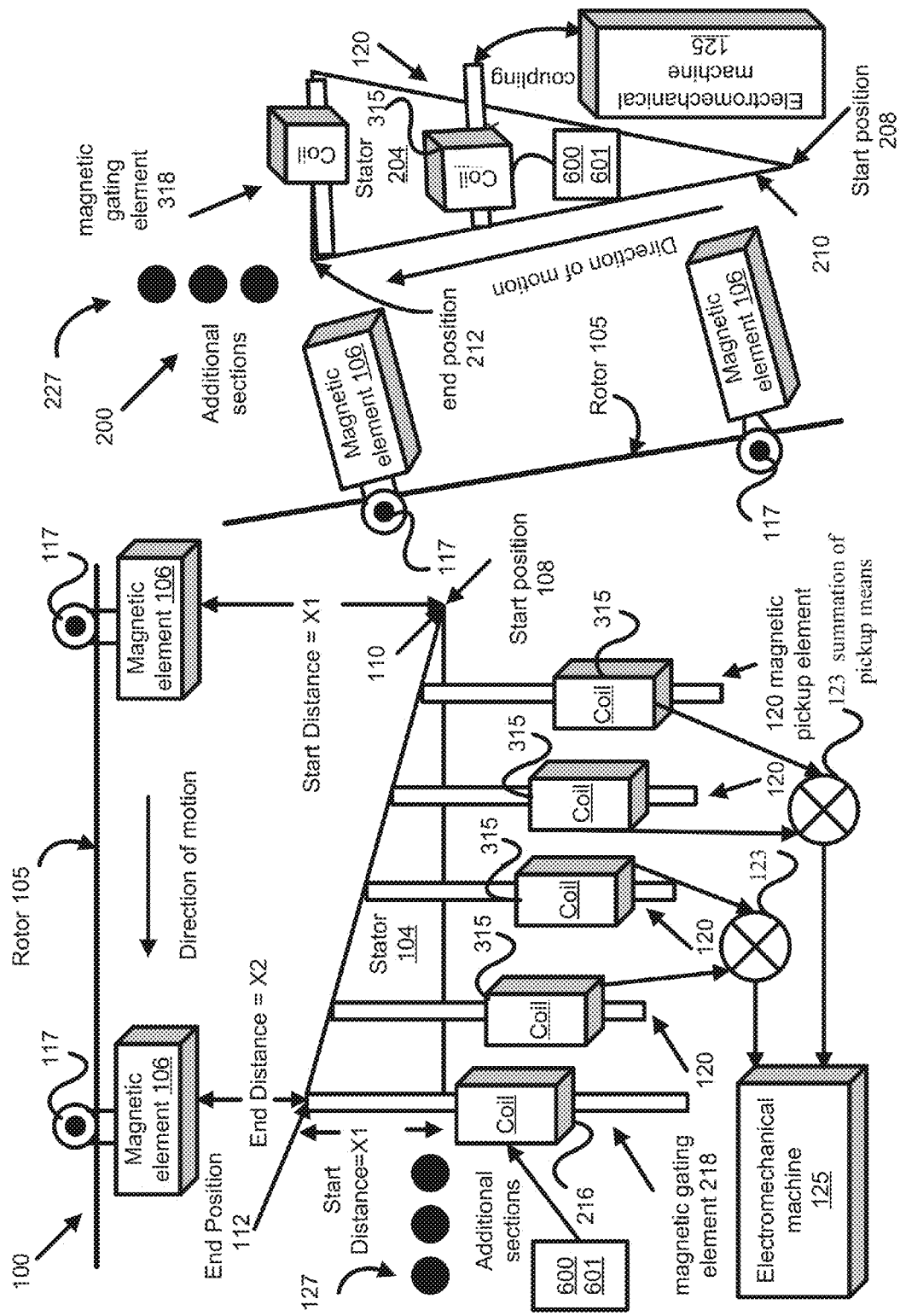

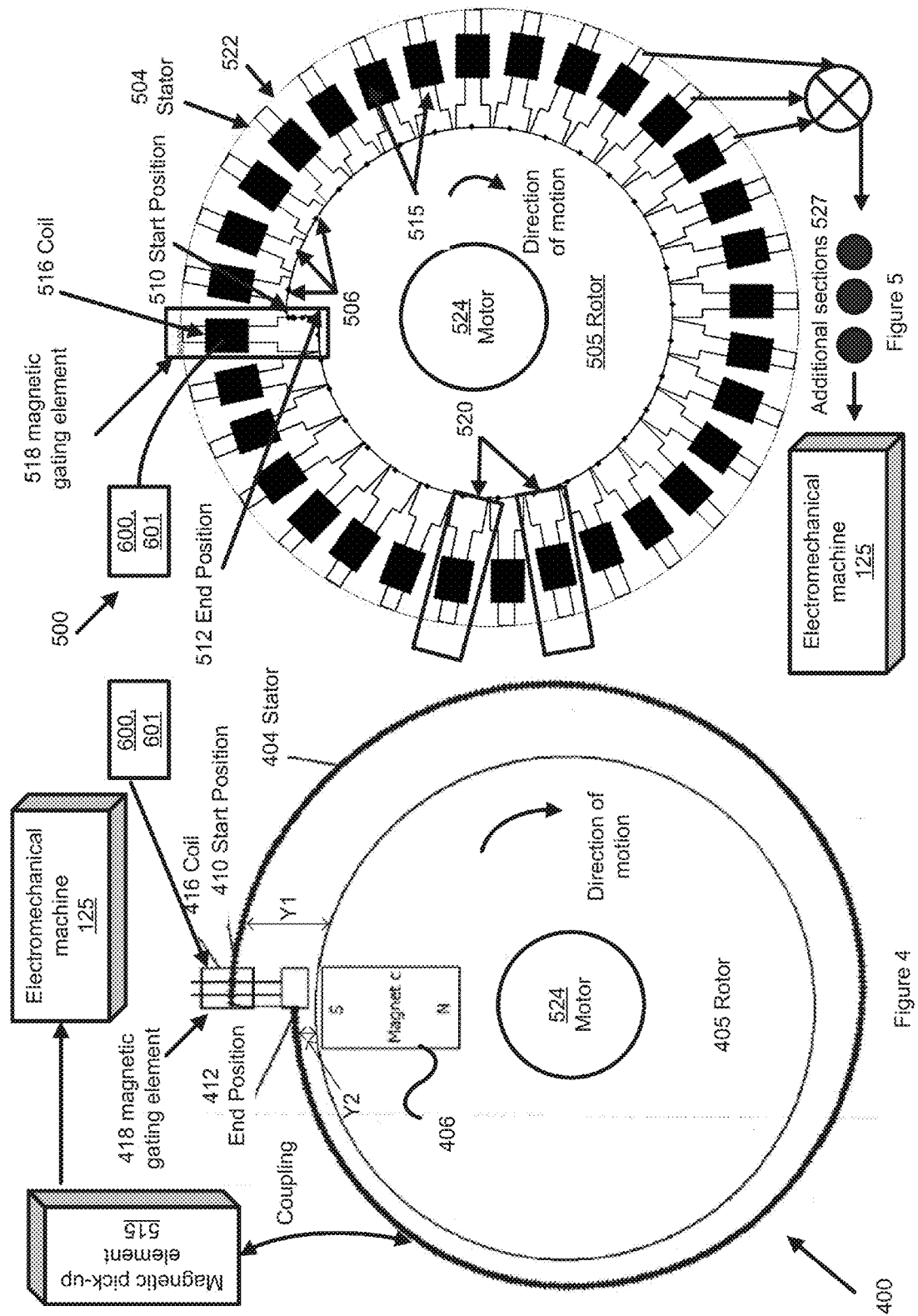

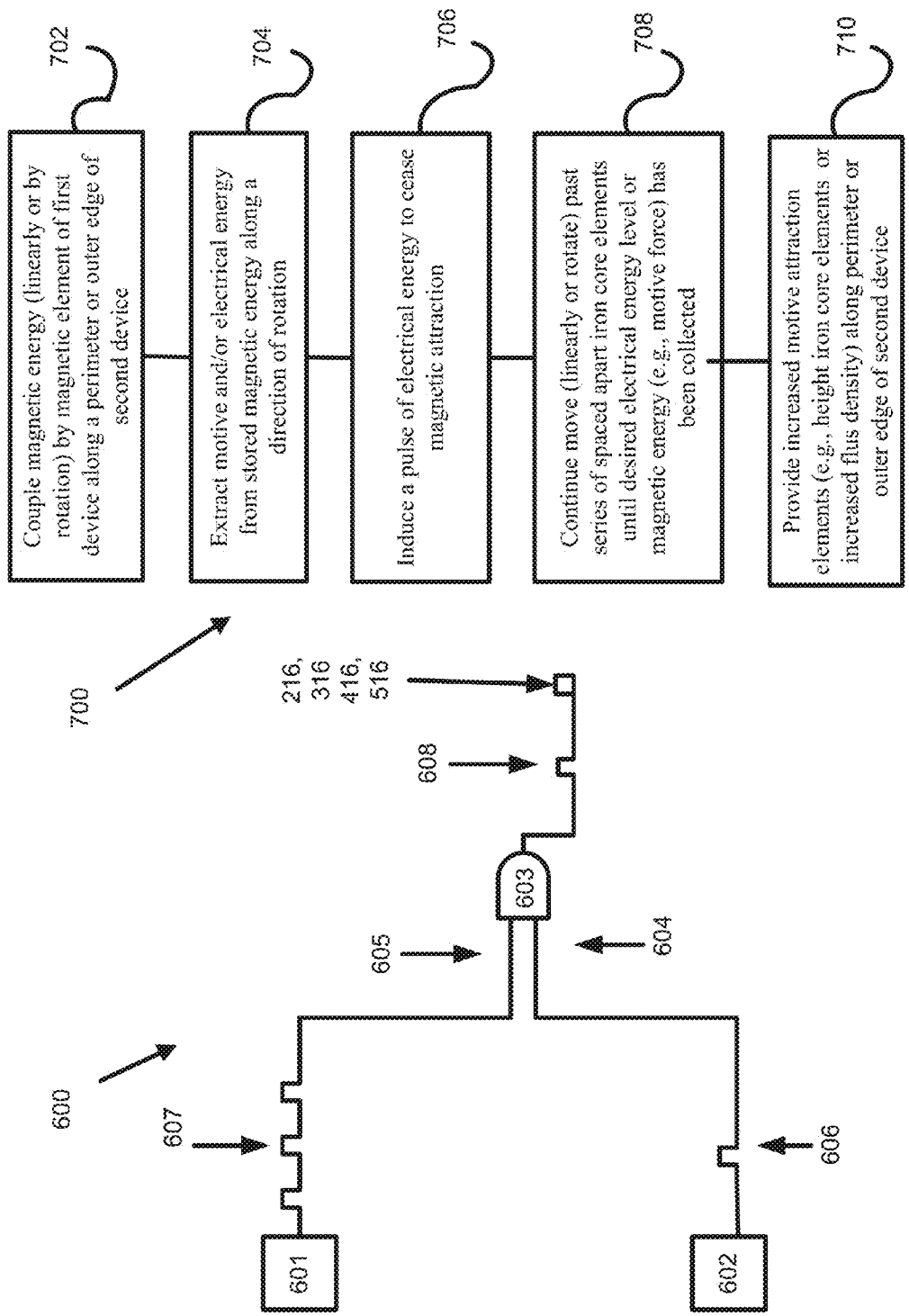

VARIABLE ATTRACTIVE FORCE MOTOR AND GENERATOR

CROSS-REFERENCE TO RELATED APPLICATION

This patent application is a continuation application of U.S. patent application Ser. No. 14/630,409, filed Feb. 24, 2015, which is a continuation application of U.S. patent application Ser. No. 13/539,487, filed Jul. 1, 2012, which applications are incorporated in their entirety here by this reference.

BACKGROUND

1. Field of the Disclosure

The present disclosure relates generally to the field of electric and motor generator systems that provide a motive force of a motor derived through an attractive force of a magnetic field in a rotor. More particularly, the present disclosure relates in one embodiment to a system for providing an increasing attractive force between a magnetic field of a rotor and a stator.

2. Description of Related Technology

Conventional rotor and stator systems require an electric current applied to a coil to induce a magnetic field in a stator so that the stator interacts with a magnetic field of a rotor. In these systems, combinations of electromagnets and permanent magnets are utilized. A conventional one-phase stepping motor may consist of a rotor having two permanent magnetic poles surrounded by a coil. Upon being energized, the rotor coil forms main stator poles. Auxiliary pole arms are divided into groups. Within each group, auxiliary poles are arranged at a distance from the rotor that decreases gradually (or in stages) in a direction of rotation of the rotor. In yet another conventional system, magnetic attraction may be created by eccentric mounting of a rotor shaft axis with respect to a stator axis to provide a directed magnetic auxiliary force due to an air gap adjustment between rotor and stator. In still other conventional system, a magnetic force is produced by determined magnetic asymmetries of pole fluxes, e.g., having smaller poles in one or more parts of a stator circumference than that in another or opposite part of the circumference.

Other conventional systems use a magnetic bearing device including a rotor having a number of permanent magnets mounted to a central shaft and connected to a driving shaft of a rotating load and a stator surrounding the rotor with an air gap. In this magnetic bearing device a stator is provided with a number of electromagnets on an inner circumference, which when energized successively, create a rotating magnetic field constituted by attracting polarities created by moving permanent magnets. Other conventional magnetic attraction systems use conductive lap windings that are interleaved with conventional loops in the stator of a motor-generator and a rotor provides magnetic induction lines that, when rotated, cuts across the lap windings and the loops. Continuing with this magnetic system, upon the rotor being laterally displaced from its equilibrium axis of rotation, magnetic lines of induction induce a current in the interleaved lap windings. The induced current interacts with magnetic lines of induction of the rotor to generate a radial force that returns the rotor to its equilibrium state.

Even in light of the above conventional system, there is still a need for apparatus and methods that may provide advantageous auxiliary, supplemental or primary electromagnetic attraction and motive force generation with or without conventional power schemes. For example, advantages electromagnetic attractive and motive force power generation would include, inter alia, improvements over conventional systems for any of the following: decreasing hardware requirements, decreasing magnetic pole count, decreasing magnetic directional force requirements, generating increased motive force with reduced dc requirements, generating by products, such as electricity, mechanical energy for motor or generator operation on section-by-section or pole-by-pole basis.

SUMMARY

In one aspect, an apparatus is disclosed for extracting electrical and mechanical energy from stored magnetic energy. The apparatus includes a linear motor including a rotor and stator by using increased motive force from a starting position to an ending position. In one variant, gap decrease as motive force increases as magnet moves from one end to another end of a stator. In one variation of this apparatus, an axial flow turbine is defined by a body having an increased magnetic density from a first exterior edge along a surface of the body to a second exterior edge, and a magnetic element rotatably operable about the body of the axial flow turbine, the magnetic element being configured to cause increasingly level of the magnetic attraction from the first exterior edge to that of the second exterior edge.

In another aspect, a method is disclosed generating electrical energy from a magnetic field. The method includes coupling, e.g., linearly coupling, rotatably coupling, magnetic energy between at least one magnetic element on a first device and at least one magnetic pick-up element, e.g., iron core, along a perimeter of a second device with a decreasing gap spacing from a first end of the perimeter to a second end of the perimeter, and extracting the electrical energy from the stored magnetic energy along a direction of motion, e.g., linear motion, rotational motion by the magnetic.

In another aspect, a system is disclosed for convening magnetic energy to mechanical and electrical energy. The system includes a stator having an arrangement, e.g., linear, arrangement, parallel arrangement, of magnetic pick-up elements aligned along a top surface of an outer stator perimeter, the magnetic pick-up elements having an increasing magnetic density from a first end of the perimeter to a second end of the perimeter; and the stator including a magnetic pick-up element coupled, e.g., axially coupled, to the stator and configured to pick-up an increasing motive energy level as the rotor operatively moves.

These and other embodiments, aspects, advantages, and features of the present disclosure will be set forth in part in the description which follows, and in part will become apparent to those skilled in the art by reference to the following description of the disclosure and referenced drawings or by practice of the disclosure. The aspects, advantages, and features of the disclosure are realized and attained by means of the instrumentalities, procedures, and combinations particularly pointed out in the appended claims.

BRIEF DESCRIPTION OF THE DRAWINGS

FIG. 1 is an illustration of a linear motor with a decreasing air gap including magnetic gating element, magnetic pick-up elements, and an electromechanical machine;

FIG. 2 is an illustration of a linear motor with a constant air gap including a magnetic gating element, magnetic pick-up element, and an electromechanical machine.

FIG. 4 is an illustration of a rotary motor including a magnetic gating element, rotor, and a magnetic pick-up element in accordance with the present disclosure;

FIG. 5 is an illustration of a rotary motor including a rotor and a stator having multiple magnetic pick-up elements in accordance with the present disclosure;

FIG. 6 is an electronic logic circuit to control gating function of FIGS. 1-5 as well as motor 524 of FIG. 5; and FIG. 7 is a method of linear or rotary motor motive energy generation in accordance with FIGS. 1-6 above.

DETAILED DESCRIPTION

Figure 3:
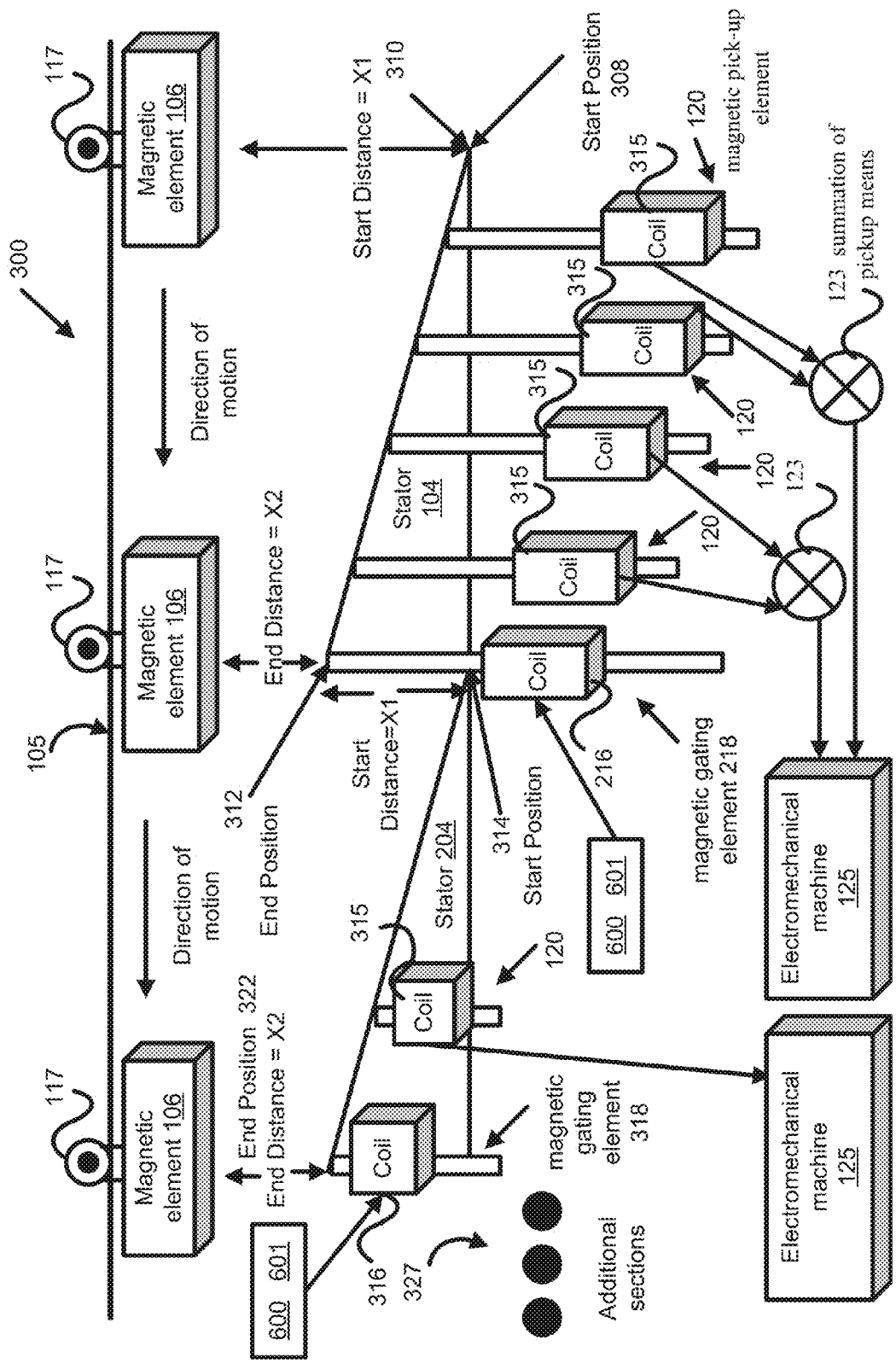
FIG. 3 is an illustration of a two stage linear motor including a magnetic gating element in accordance with the present disclosure.

Reference is now made to the drawings wherein like numerals refer to like parts throughout.

As used herein, the term "pole arm" refers to, but is not limited to, one or more regions of one or more magnetics toward which lines of magnetic induction converge that define a south pole region or lines of magnetic induction diverge that define a north pole region;

As used herein, the term "rotor" refers to, but is not limited to, a rotating member of a machine such as an electrical or mechanical device where a direction of lines of magnetic fields or induction enter or leave in accordance with either north or south region:

As used herein, the term "stator" refers to, but is not limited to, a stationary part of an electric motor, generator, or machine about which a rotor rotates:

As used herein, "linear motor" refers to, but is not limited to, an electrical motor that produces straight-line motion by means of a linear stator and rotor, e.g., rotor "unrolled" placed in parallel so that a linear force is produced along its length;

As used herein, "core", "iron core" refers to, but is not limited to, a piece of iron or other material, e.g., ore, alloy, ferrite, that has its atomic properties orderly arranged that it exhibits properties of magnetism;

As used herein, "magnetic pick-up element", "magnetic pick-up means", "magnetic pick-up pole", or "generator means" refers to, but is not limited to, a core, which is surrounded by an electrical core winding, which through electromagnetic induction induces a flux change in the electrical core winding, producing an electric current across the electrical core winding, when moving past a magnetic field;

As used herein, "gate", "gating element" or "gating means", refers to, but is not limited to, a core, which is surrounded by an electrical core winding, commonly referred to as an electromagnet, that is energized with an electrical pulse, or that is mechanically actuated so as to neutralize or counteract its magnetic attractiveness to a magnetic element; and As used herein, "magnet" or "magnetic element" refers to, but is not limited to, permanent magnet, an electromagnet, a piece of iron or other material, e.g., ore, alloy, ferrite, that has its atomic properties orderly arranged that it exhibits properties of magnetism; and As used herein, "motive force" refers to, but is not limited to, an increased magnetic flux density produced by magnetic attraction between a magnetic element and a stator.

Overview

In one salient aspect, the present disclosure discloses apparatus and method for generating motive force, inter alia, such as electrical and mechanical power that are by products of one or more magnetic fields or electromagnetic processes, including commercial power and energy generation and distribution. The apparatus includes an axial flow turbine defined by a body having an increased magnetic density from a first exterior edge along a surface of the body to a second exterior edge. A magnetic element rotatably configured about the axial flow turbine causes increasingly level of the magnetic attraction from the first exterior edge to that of the second exterior edge.

Broadly, the present disclosure generally provides a system and method for linear and rotational systems causing a magnet to do work through attraction of a magnet to a stator by a means of an increasing attractive force of the magnet to a stator. Advantageously, only one magnetic pole is required in a minimal rotor configuration and one group of poles, only one gating means action is required for a full 360 degree rotation. In the following embodiments, electricity is generated as a byproduct of motor operation as the magnet passed each magnetic pick-up pole except for last pole is a gating element.

The principles of the present disclosure even though described below as a motor may also equally apply to operation as a generator, which through rotor motion generates electrical and mechanical energy as part of smaller component system or even as part of a larger system, e.g., automobile, power plant, or the like. In one example, the present disclosure may be used to at least partially functionally control a rate of motive energy generation so as to control an electrical or mechanical operation of one or more components. The apparatus, system, and method produced according to the present disclosure may find beneficial use for reducing or energy requirements or condition one or more energy source power levels for one or more processes including, but not limited to, energy production, energy storage, energy generation, reduction in pollution due to decreased energy production or usage, or the like. The motive force generation properties of the present disclosure may provide improved efficiency of one or more energy source devices by the present disclosure and reduce requirements of power plant energy generation.

Exemplary Embodiments of the Present Disclosure

Referring now to FIGS. 1-7, exemplary embodiments of the present disclosure are described in detail. It will be appreciated that while described primarily in the context of linear and rotation motor, at least portions of the apparatus and methods described herein may be used in other applications, such as for example and without limitation, control systems including components such as transducers, sensors, and electrical and/or optical components within manufacturing or assembly line process.

Moreover, it will be recognized that the present disclosure may find utility beyond purely motive force concerns. For example, the magnetic system and apparatus described subsequently herein may conceivably be utilized to improve other applications; e.g., increasing functionality, decrease part count, energy consumption of circuits utilized to improve energy efficiency and increase accuracy of measured or removed quantities. The calculated quantities may include improvement of quality control of objects traveling through an assembly line process for determining which portions of the process are running efficiently and which portions may require process improvements or modifications, e.g., system restart. Other functions might include module assembly, maintaining system parameters, and system monitoring and initiation (e.g., for purposes of transducers that provide multiple methods and user choices improving testing and/or operations before, during or after energy or power distribution or manufacturing, and so forth). Myriad of other functions will be recognized by those of ordinary skill in the art given the present disclosure.

Referring to FIG. 1, linear motor 100 is disclosed that extracts electrical and mechanical energy from stored magnetic energy. Initially, magnetic element 106 is positioned at a starting point of stator 104, e.g., at a start position 108 at exterior edge 110 located a start distance, e.g., X1, above stator 104. At start position 108, magnetic element 106 has a relatively low magnetic flux density, e.g., a less than a maximum magnetic flux density of stator 104. In one example, stator 104 has body that has an increased magnetic density from a first exterior edge 110 along a surface of the body to second exterior edge 112, e.g., end position. In one example, increased magnetic density may be due a combination of one or more of decreased air gap relative to magnetic element 106 or increased permeability of stator 104 along a length of stator 104. In one example, as magnetic element 106 moves linearly, e.g., rolls using coupled wheel 117, along linear rail 105, e.g., unrolled rotor, toward a maximum magnetic flux density its position gap distance to stator decreases, e.g., air gap decreases. For instance, magnetic element 106 has a gap that decreases from distance X1 to X2, e.g., X2 being end distance, having value, e.g., height, less than X1. For instance, X1 may be 0.499 inches and the X2 may 0.121 inches. As such, magnetic element 106 is configured to cause increasingly level of the magnetic attraction from first exterior edge 110 to that of the second exterior edge 112. The increased motive force between magnetic element 106 and stator 104 may be then coupled by a magnetic pick-up means 120, e.g., one or more magnetic core(s) 120 including coil 315, either as a solely or in an auxiliary fashion by summation of pickup means 123, e.g., a magnetic coupler. In this example, the summation of pickup means 123 provides an increased or supplemental mechanical or electrical energy to an existing electrical or mechanical power source, e.g., electromechanical machine 125. In one variant, the electromechanical machine 125 may have a magnetic shaft, magnetic coil or magnetic core. Magnetic gating element 218 is configured to provide an initial motive force to commence, e.g., initiate motion, of magnetic element 106 past, e.g., create a gating means, past end position 112 with electrical pulse from electrical circuit 600 to additional section(s) 127. Additional sections 127, e.g., on a section-by-section basis of the above linear motor 100, in FIG. 1 represented by three dots, may be cascaded, e.g., inserted serially, so an electrical or mechanical power level for a particular application may be chosen or achieved.

Turning to FIG. 2, a variant of FIGS. 1 and 3, stators 204 coupling to magnetic element 106 are disclosed using constant air gap. In operation, increased flux density is provided along magnetic element 106 travels, for example using coupled wheels 117, along linear rail 105, e.g., unrolled rotor, involves transitioning of material properties along length of stator 104. For instance, material properties may include stator 104 having linearly or exponential increasing magnetic material permeability as magnetic element is linearly moveable along its length, e.g., from start portion 108 along first exterior edge 210 to end position 212, for example, along linear rail 105. In an alternative embodiment of FIGS. 4 and 5, magnetic element 406, 506 may be rotatably operable to pass along a constant distance along surface of body from and between first exterior edge 410, 510 to that of second exterior edge 412, 512 wherein density from first exterior edge 410, 510 has increasing magnetic pressure, e.g., magnetic attractive properties, magnetic flux density, to that of second exterior edge 412, 512. In this variant, magnetic gating element 318 is configured to provide an initial motive force to commence, e.g., initiate motion, of magnetic element 106 past, e.g., create a gating means, to end position 212 with electrical pulse from electrical circuit 600. Additional sections 227, e.g., on a section-by-section basis of the above linear motor 200, in FIG. 2 represented by three dots, may be cascaded, e.g., connected serially, so an electrical or mechanical power level for a particular application may be chosen or achieved.

Referring to linear motor 300 of FIG. 3, an additional electromagnetic source is included including core winding 315 and core, e.g., iron core, forms a magnetic pickup means 120 for electromagnetically coupled flux density generated by magnetic element 106 of linear motor 100 illustrated in FIG. 1. In one example, increased magnetic density may be due a combination of one or more of decreased air gap relative to magnetic element 106 or increased permeability of stator 104, 204 along a length of the stator 104, 204. In operation similar to that of FIG. 1, magnetic element 106 moves linearly, e.g., using coupled wheels 117, along linear rail 105, e.g., unrolled rotor, from start position 308 at first exterior edge 310, to end distance X2, at second exterior edge 312, generate an increasing magnetic flux density between magnetic element 106 and stator 104. In one variant, core 318, e.g., iron core, is disposed between first exterior edge 310 and second exterior edge 312 of stator 104. In this variant, magnetic gating element 218 is configured to provide an initial motive force to commence, e.g., initiate motion, of magnetic element 106 past, e.g., create a gating means, to end position 322 with electrical pulse from electrical circuit 600. In one example, electrical circuit 600 includes pulse generator 601, which is included in the discussion of the text and FIG. 6 supra.

For example, electrical coil 216, e.g., core winding 216, disposed about core 218, e.g., iron core, is electrically coupled to create a gating means to momentarily counteract, e.g., magnetically gate, an motive force to pass magnetic element 106 from first exterior edge 310, e.g., start position, to second exterior edge 322, e.g., end position. In operation, magnetic element 106 is positioned at a starting point of stator 204, e.g., at start position 314 located a start distance, e.g., X1, above stator 204. At start position 314, magnetic element 106 has a relatively low magnetic flux density, e.g., a less than a maximum magnetic flux density of stator 104. In one example, stator 204 has body that has an increased magnetic density from first exterior edge 312 along a surface of the body to second exterior edge 322. As magnetic element 106 moves linearly toward a maximum magnetic flux density its position gap distance to stator decreases, e.g., air gap decreases. For instance, magnetic element 106 has a gap that decreases from distance X1 to X2, e.g., X2 being end distance, having value, e.g., height, less than X1. In one variant, linear motion of motor 300 operates about magnetic element 106 in an opposite linear direction to magnetic charge of magnetic element 106. Additional sections 327, e.g., on a section-by-section basis of the above linear motor 300 may be cascaded so an electrical or mechanical power level for a particular application may be achieved. In one variant, magnetic gating element 318 is configured to provide an initial motive force to commence, e.g., initiate motion, of magnetic element 106 past, e.g., create a gating means, past end position 322 with electrical pulse from electrical circuit 600 to one or more additional sections 327. Additional sections 327, e.g., on a section-by-section basis of the above linear motor 300, in FIG. 3 represented by three dots, may be cascaded, e.g., serially connected therewith, so an electrical or mechanical power level for a particular application may be chosen or achieved.

Applications for linear motor 100, 200, or 300 may include ones where magnet is moving over a rail equipped with stators to generate electrical or mechanical energy. In particular, a roller coaster car and track may be equipped with one or more portions of linear motor 100, 200, or 300 to generate energy electricity or mechanical energy to sustain motion or its reduce energy requirements. More specifically, a roller coaster car may be equipped with one or more magnets, e.g., magnetic element(s) 106. Each time the one or more roller coaster cars pass a track equipped with a rail, e.g., linear rail, having one or more stators, e.g., stator(s) 104, 204, electrical or mechanical energy is generated on a section-by-section basis and coupled to, for instance, energy providing system, e.g., electromechanical machine 125, to operate the roller coaster. In one alternative of this example, motive energy, e.g., increased magnetic flux density being generated each time the one or more magnets, e.g., magnetic element(s) 106, passes from start position 108, 208, 308 to end position 112, 212, 312, 322. Advantageously, this generated energy reduces an energy requirement of motor, e.g., electromechanical machine 125, for roller coaster car to pass to the next portion of the track. In one variant, the electrical or mechanical energy generated may be used to power other items in the amusement part, e.g., lighting, pedestrian cross-walk signals, bus stop or discharge area lightings, charge emergency power and storage systems, electronic calculating speed signal signs, and the like. Advantageous, the linear motors 100-300 generated increased motive force so that, for example, a motor associated with a roller coaster example will perform less work. In addition, the linear motor can also produce electrical energy for example to operate electrical lighting.

Turning now to rotary apparatus 400 of FIG. 4, electrical and mechanical energy is extracted from stored magnetic energy using principles illustrated in linear motors 100, 200 of FIGS. 1, 2 and 3. In operation, axial flow turbine 404 is defined by body having an increased magnetic density from first exterior edge 410 along surface of the body to second exterior edge 412. In one variant, magnetic element 406 rotatably operable about the body of axial flow turbine 404, magnetic element 406 being configured to cause increasingly level of the magnetic attraction from first exterior edge 410 to that of second exterior edge 412. Magnetic element 406 is a rotor and axial flow turbine 404 is a stator. In one example, magnetic element 406 is rotatably operable to pass increasingly closer along surface of the body from the first exterior edge 410 to that of the second exterior edge 412 to restart another motive energy cycle. In yet another alternative, magnetic element 406 is rotatably operable to pass with an increasing smaller gap, e.g., start distance Y1, end distance Y2, from first exterior edge 410 along the surface of the body to second exterior edge 412.

In one variant as illustrated in principles of FIG. 3 and discussed briefly above, magnetic element 106 may be rotatably operable to pass a constant distance along surface of body from first exterior edge to that of second exterior edge wherein density of first exterior edge 410 increases a magnetic pressure, e.g., magnetic flux density, to that of second exterior edge 412. In another variant of FIGS. 1 and 2, iron core is disposed between first exterior edge 410 and second exterior edge 412 of the axial flow turbine 404 and configured to provide an initial motive force to commence magnetic element 406 rotation about axial flow turbine.

Magnetic gating element 418 including electrical coil 416 disposed about iron core is electrically coupled to momentarily counteract motive force to pass magnetic element from second exterior edge 412 to first exterior edge 410. Axial flow turbine 404 rotatably operates about magnetic element 406 in an opposite rotational direction to that of magnetic element 406.

As illustrated in FIG. 5, system 500 has been disclosed for converting magnetic energy to mechanical and electrical energy. System 500 includes stator 504 having a parallel arrangement of magnetic pick-up elements 520 including coil 516, aligned along top surface of an outer stator perimeter 522. In one example, magnetic pick-up elements 520 having an increasing magnetic density from first end 510 of perimeter 522 to second end 512 of perimeter 522. The increase magnetic density may be due to decreasing air gap relative to magnetic element 506 and/or in combination with increased permeability along stator 504. Additionally, rotor 505 provides magnetic pick-up element 120 or adjacent electromechanical machine 125, for example, axially coupled or linearly coupled to stator 504 and configured to operatively rotate from first end 510 to second end 512 of stator 504 to create an increasing motive energy level as rotor 505 operatively rotates. In one variant, magnetic pick-up elements 520 include an increasing magnetic permeability from first end 510 to second end 512. In yet another variant, magnetic gating element 518 is configured to provide an initial motive force to commence, e.g., initiate motion, of magnetic element 506 past, e.g., create a gating means, past end position 512 to first end 510 with electrical pulse from electrical circuit 600 and resume another energy conversion cycle. In addition, rotational device 524, e.g., motor 524, controls relative speed of rotation of rotor 505 as compared to stator 504 to achieve a desired motive force energy level. In one example of FIGS. 5 and 6, these rotary motors may be incorporated as part of a back-up electrical power generation system. For instance, inside a covering or shell of a power generator, the rotary motors of FIGS. 5 and 6 may be installed. In particular, one or more magnet(s) 406, 506 may be installed on a motor blade that spins about to couple electrical or mechanical energy to one or more stator(s) 404, 504 positioned inside a housing of a power generator and collected by one or more electromechanical machine(s) 125 so as to supplement output power of the power generator so as to reduce its input power requirements. Additional sections 527, e.g., on a section-by-section basis of the above rotary motor 500, in FIG. 5 represented by three dots, may be cascaded, e.g., parallel connected, to achieve a desired electrical or mechanical power level for a particular application.

As illustrated in FIG. 6, controlling the speed of a linear or rotary motor 100, 200, 300, 400, 500 include an electrical circuit 600 that recognizes when magnet 106, 406, 506 registers with magnetic gating mean(s) 218, 418, and 518. In this example, register sensor 602 causes pulse 606 input 604 to a signal summation device, e.g., AND gate 603. Variable speed pulse generator 601 is connected to input 605 of AND gate 603. Magnet(s) 106, 406, 506 waits at magnetic gating mean(s) 218, 318, 418, 518 until a pulse 607 arrives from pulse generator 601 to charge magnetic gating mean(s) 218, 318, 418, 518 such that magnet 106, 406, 506 passes through motor second end(s) 214, 412, 512 to start another cycle from that of the motor first end 216, 410, 510. In summary, electrical circuit 600 including variable speed pulse generator, for example, by signal generation, e.g., pulse generation, controls a speed of the motor, e.g., 100, 200, 300, 400, 500, which controls the amount of electrical and mechanical energy produced.

Turning now to FIG. 7, a method 700 is disclosed for generating mechanical and electrical energy from a magnetic field. The method includes step of coupling (linearly or by rotation) magnetic energy between at least one magnetic element 106, 406, 506 on first device 104, 204, 405, 505 and at least one magnetic pickup means 315, 415, 515 (e.g., at least one iron core element) along perimeter of second device 104, 204, 404, 504 with decreasing gap spacing, or increasing flux density from first end 104, 204, 410, 510 of perimeter to second end of perimeter (step 702). In another step, the method includes extracting mechanical and electrical energy from stored magnetic energy along a direction of rotation by the magnet element 106, 406, 506 (step 704).

In one variant, the method may include the step of inducing a pulse of electrical energy to cease magnetic element attraction to the at least one iron core element (magnetic gating element) 218, 318, 418, 518 to allow the at least one magnetic element 106, 406, 506 to gate from second end 112, 212, 312, 414, 514 from the first end 322 past at least one iron core element 218, 318, 418, 518 to start another magnetic energy conversion cycle or another electrical energy conversion cycle (step 706). In another variant, the method may include continually (linearly or rotatably) coupling past at least one iron core element 120, 520 until a desired electrical energy level has been collected (step 708).

In one of variant of steps 706 or step 708, the at least one iron core element 120, 520 includes series of spaced apart, increasing height iron core elements 120, 520 from the first end 110, 210, 510 to the second end 112, 212, 512 along perimeter of second device (step 710). In alternative, rotatably coupling magnetic energy includes first device 405, 505 rotating about second device 404, 504.

In yet another variant of step 708, the rotatably coupling magnetic energy includes the first device 405, 505 and the second device 404, 504 rotating about each other in opposite rotational directions. In still another alternative of step 708, the rotatably coupling magnetic energy includes the second device 404, 504 rotating about the first device 404, 504. In one example, each of the series of spaced apart iron core elements 418, 518 may include a magnetic gating element activated with a pulse of electrical energy to momentarily neutralize a magnetic field produced between first device and the second device as the at least one magnetic element rotates from the second end to the first end to reinitiate the next energy conversion cycle.

What is claimed is:

1. An apparatus for extracting electrical and mechanical energy from stored magnetic energy, the apparatus comprising: a stator having an increased magnetic density from a start position of the stator to an end position of the stator; and a magnetic element adjacent to the stator that is operatively connected to a rotor, the magnetic element and the stator being configured to move relative to each other to cause increasing motive force from the start position to the end position.

2. The apparatus of claim 1, further comprising a gating element disposed between the start position and the end position of the stator and configured to provide an initial motive force to commence a magnetic element motion relative to the stator.

3. The apparatus of claim 1, wherein the magnetic element is operable to pass progressively closer along a surface of the stator from the start position to the end position.

4. The apparatus of claim 1, further comprising a gating means to momentarily counteract a magnetic force to pass the magnetic element from the end position to the start position.

5. The apparatus of claim 1, wherein the magnetic element is operable to pass with a progressively smaller gap from the start position of the stator to the end position of the stator.

6. The apparatus of claim 1, wherein the magnetic element is operable to pass a constant distance along the stator from the start position to the end position wherein the magnetic density increases from the start position to the end position.

7. A method for generating electrical energy from a magnetic field, the method comprising: coupling magnetic energy between at least one magnetic element on a first device and at least one core element positioned along a second device with an increasing magnetic attractive force from a first end of the second device to a second end of the second device; and extracting the electrical energy from stored magnetic energy along a direction of motion by the at least one magnetic element on the first device.

8. The method of claim 7, further comprising means to cease the increasing magnetic attractive force to the at least one core element to allow the at least one magnetic element to gate from the second end to the first end past the at least one core element to start a new energy conversion cycle.

9. The method of claim 7, further comprising continually rotatably coupling past the at least one core element until a desired electrical energy level has been collected.

10. The method of claim 7, wherein the at least one core element includes a series of spaced apart, increasing height, core elements from the first end to the second end along the second device.

11. The method of claim 10, wherein a last pole of the series of spaced apart, increasing height, core elements includes a core winding activated with a pulse of electrical energy to momentarily neutralize a magnetic field produced between the first device and the second device as the at least one magnetic element moves from the second end to the first end to reinitiate another magnetic energy conversion cycle.

12. The method of claim 7, wherein the coupling magnetic energy includes the first device moving relative to the second device.

13. The method of claim 7, wherein the coupling magnetic energy includes the first device and the second device moving relative to each other in opposite directions.

14. The method of claim 7, wherein the coupling magnetic energy includes the second device moving relative to the first device.

15. A system for converting magnetic energy to mechanical and electrical energy, the system comprising: a stator having an arrangement of magnetic pick-up elements aligned along the stator, the magnetic pick-up elements having an increasing magnetic density from a first end of the stator to a second end of the stator; and a rotor comprising a magnetic element coupled to the stator and configured to operatively move from the first end to the second end of the stator to create an increasing motive energy level as the rotor operatively moves relative to the stator.

16. The system of claim 15, further comprising an electrical coil operatively coupled to a magnetic pole between the first end and the second end of the stator to pulse an electrical current to disrupt a flow of magnetic energy from the rotor to the stator to allow the rotor to pass from the second end to the first end and resume another energy conversion cycle.

17. The system of claim 15, further comprising devices that control a speed of a motion of the rotor as compared to the stator to achieve a desired motive force energy level.

\* \* \* \* \*